United States Patent
Le et al.

(10) Patent No.: US 10,472,473 B2
(45) Date of Patent: Nov. 12, 2019

(54) ENHANCING Z-CONDUCTIVITY IN CARBON FIBER REINFORCED PLASTIC COMPOSITE LAYUPS

(71) Applicant: The Boeing Company, Chicago, IL (US)

(72) Inventors: Quynhgiao Le, Bellevue, WA (US); Robert B. Greegor, Black Diamond, WA (US); Brent Arthur Whiting, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 654 days.

(21) Appl. No.: 14/721,880

(22) Filed: May 26, 2015

(65) Prior Publication Data

US 2016/0347918 A1 Dec. 1, 2016

(51) Int. Cl.
| | | |
|---|---|---|
| *C08J 5/04* | (2006.01) | |
| *B29C 70/30* | (2006.01) | |
| *B29C 70/54* | (2006.01) | |
| *B29C 70/88* | (2006.01) | |

(Continued)

(52) U.S. Cl.
CPC ............... *C08J 5/042* (2013.01); *B29C 70/30* (2013.01); *B29C 70/54* (2013.01); *B29C 70/545* (2013.01); *B29C 70/882* (2013.01); *B29C 70/025* (2013.01); *B29L 2031/3076* (2013.01); *C08J 2300/12* (2013.01)

(58) Field of Classification Search
CPC ....... B29C 70/30; B29C 70/54; B29C 70/025; B29C 70/545; B29C 70/882; B29L 2031/3076; C08J 2300/12; C08J 5/042
See application file for complete search history.

(56) References Cited

U.S. PATENT DOCUMENTS

| | | |
|---|---|---|
| 4,755,904 A | 7/1988 | Brick |
| 6,790,526 B2 | 9/2004 | Vargo |
| 6,794,012 B2 | 9/2004 | Tsotsis |

(Continued)

FOREIGN PATENT DOCUMENTS

| | | |
|---|---|---|
| CA | 2917796 A1 | 1/2015 |
| EP | 2759563 A2 | 7/2014 |

OTHER PUBLICATIONS

Extended European Search Report in corresponding application No. EP 161688544.1 dated Feb. 16, 2017.

(Continued)

*Primary Examiner* — Holly C Rickman
*Assistant Examiner* — Linda N Chau
(74) *Attorney, Agent, or Firm* — Ostrager Chong Flaherty & Broitman PC

(57) ABSTRACT

Carbon fiber reinforced plastic ("CFRP") composite layups and processes for manufacturing CFRP composite layups that integrate z-conductivity features directly into CFRP composite layups during the manufacturing processes for lightning protection, more particularly, inherent edge glow protection from lightning direct effects, and electrical current flow path control. CFRP composite layups are configured during the manufacturing processes to provide inter-ply electrical connections between composite plies of the CFRP composite layups, therefore avoiding the need for add-on protection features that result in significant cost and weight penalties.

18 Claims, 8 Drawing Sheets

(51) Int. Cl.
  *B29L 31/30* (2006.01)
  *B29C 70/02* (2006.01)

(56) References Cited

U.S. PATENT DOCUMENTS

| | | | |
|---|---|---|---|
| 7,223,312 | B2 | 5/2007 | Vargo |
| 7,525,785 | B2 | 4/2009 | Rawlings |
| 7,864,501 | B2 | 1/2011 | Rawlings |
| 7,934,676 | B2 | 5/2011 | Dufresne |
| 8,658,256 | B2 | 2/2014 | Shokri |
| 8,687,342 | B2 | 4/2014 | Rawlings |
| 2008/0128430 | A1 | 6/2008 | Kovach |
| 2010/0107513 | A1 | 5/2010 | Buchanan |
| 2010/0264274 | A1 | 10/2010 | Bradley |
| 2010/0314029 | A1 | 12/2010 | Lindgren |
| 2011/0008587 | A1 | 1/2011 | Ruskin |
| 2012/0141763 | A1 | 6/2012 | Cawse |
| 2012/0171477 | A1 | 7/2012 | Sang |
| 2013/0034705 | A1 | 2/2013 | Matsen |
| 2013/0330514 | A1 | 12/2013 | Cawse |
| 2013/0344314 | A1 | 12/2013 | Shokri |
| 2014/0004275 | A1 | 1/2014 | Yin |
| 2014/0099477 | A1 | 4/2014 | Matsen |
| 2014/0106143 | A1 | 4/2014 | Shokri |
| 2014/0212620 | A1 | 7/2014 | Gaw |
| 2015/0274316 | A1* | 10/2015 | Kamihara ............ B64C 3/34 244/1 A |

OTHER PUBLICATIONS

European Search Report in corresponding application No. EP 161688544.1 dated Nov. 3, 2016.

"Menu Very High Performance Technical Sewing Threads," Tibtech Innovations, printed from Internet on Apr. 17, 2015 at http://www.tibtech.com/sewing_yarns#thermosew.

Tenax® Filament Yarn, TohoTenax Europe GmbH, printed from Internet on Apr. 17, 2015 at http://www.tohotenax-eu.com/en/products/tenax-carbon-fiber/filament-yarn.html.

SAE AE-2 Lighting Committee, Policy Guidance for Fuel Tank Structural Lighting Protection, Revision 1, Jul. 5, 2011.

Priyanka Dhurvey et al., Review on Various Studies of Composite Laminates with Ply Drop-Off, ARPN Journal of Engineering and Applied Sciences, vol. 8, No. 8, Aug. 2013, Bhopal, India.

F.A. Fisher et al., Aircraft Lighting Protection Handbook, Lighting Technologies Inc., Sep. 1989, Denver Colorado.

LORD Corporation, LORD Ultaconductive Coating for EMI Sheilding, Cary, NC, Rev. Jan. 2014.

Quest Global Services PTE LTD, Rising Adoption of Composites Signify Innovations in the Aerospace Industry, 2013, Singapore.

Benjamin John Phillips, Multidisciplinary Optimisation of a CFRP Wing Cover, Cranfield University, 2009.

Dominic Gates, Building the 787|When Lightening Strikes, The Seattle Times Company, Mar. 5, 2006.

Erik T. Thostenson et al., Aligned multi-walled carbon nanotube-reinforced composites: processing and mechanical characterization, Journal of Physics D: Applied Physics, vol. 35, No. 16, Aug. 6, 2002.

L. Chemartin et al., Direct Effects of Lightning on Aircraft Structure: Analysis of the Thermal, Electrical and Mechanical Constraints, Journal Aerospace Lab, Issue 5, Dec. 2012.

Henkel, Emralon 8301 Product Data Sheet, Henkel, MI.

Greg Sweers et al., Lightning Strikes: Protection, Inspection, and Repair,www.boeing.com/boeingedge/aeromagazine, Aero Quarterly, Qtr 4 12, pp. 19-28.

G.T. Caneba et al., Novel Ultrasonic Dispersion of Carbon Nanotubes, Journal of Minerals & Materials Characterization & Engineering, vol. 9, No. 3, pp. 165-181, 2010.

Yongxing Hu, et al., Magnetically Responsive Photonic Nanochains, Angewandte Chemie, Angew. Chem. Int. Ed. 2011, 50, 3747-3750.

2013 International Conference on Lightning and Static Electricity, Book of Abstracts, Sep. 18-20, 2013, Seattle, USA.

* cited by examiner

ENHANCING Z-CONDUCTIVITY IN CARBON FIBER REINFORCED PLASTIC COMPOSITE LAYUPS

TECHNICAL FIELD

This disclosure relates generally to carbon fiber reinforced plastic ("CFRP") composite layups with enhanced electrical conductivity in the z-direction perpendicular to the plane of the composite (i.e., z-conductivity) and, more particularly, to CFRP composite layups that provide flow paths to route electrical current (e.g., lightning or electrical signals) between carbon fiber layers or plies of the CFRP composite layups.

BACKGROUND

CFRP composite layups are becoming increasingly common in a wide variety of industries to construct component parts and structures that require superior strength-to-weight and strength-to-stiffness ratios. For example, in the aerospace industry, CFRP composite layups are constructed to form aircraft components (such as frames, ribs, spars, stringers and panels), which are used to manufacture aircraft structures (such as fuselages, wings, wing boxes, fuel tanks and tail assemblies), because of the significant weight reduction that such CFRP composite layups provide, the high structural rigidity and strength they provide, and the resulting airplane performance benefits.

CFRP composite layups generally comprise one or more composite layers or plies, each of the composite layers or plies are comprised of at least a reinforcement material and a matrix material. The matrix material is generally a non-conductive polymer such as an epoxy thermoset resin or a thermoplastic fluoropolymer that surrounds, binds and supports the reinforcement material, and transfers component stresses between layers of the reinforcement material. The reinforcement material in each layer or ply generally consists of strands of carbon fiber, which are electrically conductive and provide structural strength to the matrix material and the CFRP composite layups. During typical lay-up processes, one or more composite layers or plies are formed and/or placed (i.e., laid up) into a lay-up mold, mandrel or tool having a desired shape and size of the CFRP composite layup, and then cured and cut or trimmed to form the desired shape and size of the CFRP composite layup.

Cutting or trimming cured CFRP composite layups typically results in tips or ends of the conductive carbon fiber reinforcement material in each of the composite layers or plies becoming exposed to the environment at the cut or trimmed edges. Tips or ends of the conductive carbon fiber reinforcement material may also become exposed to the environment at external drop offs or sloped surfaces of a CFRP composite layup. For example, CFRP composite layups may be formed by laying up composite layers or plies with progressively shorter lengths on top of each other, such that the CFRP composite layups have a first end with a first length and a second end with a second length shorter than the first length, and a transition area between the first end and the second end with a sloped upper surface having a downward slope or drop off forming a non-vertical edge. Such drop offs may be positioned at any location along the length of a CFRP composite layup. The ends of the composite layers or plies forming the drop off may not be completely covered by matrix material, leaving the tips or ends of the conductive carbon fiber reinforcement material exposed to the environment.

Despite the presence of conductive carbon fibers in each of the composite plies, CFRP composite layups are not as electrically conductive as typical aerospace metallic structures and generally have more resistance to electricity, particularly in the z-direction (through the thickness of or perpendicular to the layup), than metallic structural materials such as aluminum, which is traditionally used, for example, in the aerospace industry. Thus, CFRP composite layups do not easily conduct and dissipate current associated with a lightning threat environment of commercial transport structures as described in SAE Aerospace Recommended Practice (ARP) ARP5414A, Aircraft Lightning Zoning, reaffirmed Sep. 28, 2012, and published by SAE International.

Among the physical phenomena observed from lightning strikes is a phenomenon known as "edge glow," which describes the condition in which a glow of light possibly combined with particle or plasma ejections appears at the tips or ends of carbon fibers in exposed fiber surfaces of CFRP composite layups. As used herein, the term "exposed fiber surfaces" refers to any edges of a CFRP composite layup having exposed conductive carbon fibers, including cut or trimmed edges and edges in drop offs that are not completely covered by matrix material, as described above. Edge glow is caused by voltage differences between composite layers of the CFRP composite layups, and typically occurs in high current density areas resulting from a lightning strike, where the voltage potential difference between layers is at its maximum, such as at the exposed fiber surfaces.

The general design approach in the aerospace industry to prevent any possible negative effects of edge glow is to mask or seal all exposed fiber surfaces in any susceptible environment. One method is to seal the exposed fiber surfaces with a non-conductive or insulating material, such as a polysulfide sealant, that inhibits transmission of the glow of light and/or physically ejected particles. Another known method to guard against edge glow, sparking and plasma discharges around fastened joints in a composite structure and exposed fiber surfaces of a CFRP composite layup is to place an insulating, premolded cap over the exposed fiber surfaces or fastened joints.

The foregoing methods only mask or shield edge glow at the exposed fiber surfaces and do not prevent, reduce or eliminate edge glow. Also, these methods are labor intensive and require excessive production flow time because of the amount of work needed to prepare exposed fiber surfaces for successful sealant adhesion and the long cure times associated with the sealants. These methods also add significant weight to a composite structure made from CFRP composite layup components because of the required thickness and/or multiple layers of the sealants, which in the aerospace industry, increases aircraft fuel consumption and reduces performance.

It is therefore desired to make CFRP composite layups with less labor intensive and time consuming methods and with improved control of electrical current flow paths through the CFRP composite layup to mitigate edge glow and provide other electrical benefits with minimal weight penalty. As used herein, the term "mitigating edge glow" means reducing the intensity of edge glow or eliminating edge glow.

SUMMARY

The foregoing purposes, as well as others that will be apparent, are achieved generally by providing CFRP composite layups and processes for manufacturing CFRP composite layups that integrate z-conductivity features directly into CFRP composite layups during the manufacturing processes. The z-conductivity features are configured during the manufacturing processes to provide inter-ply electrical connections between composite layers or plies of the CFRP composite layups to manage current transfers between composite layers or plies, and therefore avoid the need for add-on protection features that result in significant cost and weight penalties, as well as manufacturing inefficiencies. At least a portion of the conductive carbon fiber reinforcement material in each of the composite layers or plies is electrically connected to at least a portion of the conductive carbon fiber reinforcement material in an adjacent composite layer or ply of the CFRP composite layup to provide the inter-ply electrical connections, preferably made throughout an entire thickness of the CFRP composite layup and formed at or near cut edges of the CFRP composite layup or at other locations where it is desired to create a path for electricity to follow.

In a first embodiment, the inter-ply electrical connections are made in the CFRP composite layup by displacing the carbon fiber reinforcement material in one or more plies of the CFRP composite layup to create an out-of-plane distortion (i.e., a wave or fold) in the CFRP composite layup. The CFRP composite layup is formed from a plurality of composite plies comprising an upper ply, a lower ply and one or more inner plies between the upper ply and the lower ply. The one or more inner plies are configured with an out-of-plane distortion at or near a cut edge of the CFRP composite layup that forms the inter-ply electrical connections.

In a second embodiment, the inter-ply electrical connections are made in the CFRP composite layup by wrapping or folding one composite ply over cut edges of one or more adjacent composite plies in the CFRP composite layup. The CFRP composite layup is formed from a plurality of composite plies comprising an upper ply, a lower ply and one or more inner plies between the upper ply and the lower ply. In this embodiment, the upper ply is configured with a length that is longer than the length of the lower or adjacent ply and the one or more inner plies, and is wrapped or folded over a cut edge of the lower ply and the one or more inner plies where ends of the conductive carbon fiber reinforcement material are exposed. A bottom surface of the upper ply is secured to the cut edges of the lower ply and the one or more inner plies with an electrically conductive sealant/adhesive such that the carbon fiber reinforcement material in the upper ply makes electrical contact with the carbon fiber reinforcement material at the cut edges of the lower ply and inner plies.

In a third embodiment, the inter-ply electrical connections are made in the CFRP composite layup by forming a crimp at or near the cut edge of the CFRP composite layup. The crimp pushes the conductive carbon fiber reinforcement material in each of the composite plies together to within a distance of 10 micron or less to form the inter-ply electrical connections.

In a fourth embodiment, the inter-ply electrical connections are made in the CFRP composite layup with an electrically conductive material, such as stitching, thread pins or staples, that penetrates through the CFRP composite layup to electrically short the composite layers or plies in the z-direction.

For the purpose of edge glow mitigation, the z-conductivity features integrated into CFRP composite layups and related methods of manufacture in all of the embodiments disclosed herein may be incorporated in one or more rows positioned at or near the cut edges of the CFRP composite layups, in some embodiments about 1 inch or less from a cut edge of the CFRP composite layups. The z-conductivity feature may also be used in many applications and industries, and positioned in other positions and arrangements (not necessarily at or near the cut edges) to create paths for controlled routing of electrical current (e.g., lightning or electrical signals) between composite plies of a CFRP composite layup to better control the effects of excess electrical current and/or to manage electrical currents by design as part of an integrated system. For example, lightning current may be routed from a higher threat zone to a lower threat zone in a structure made from CFRP composite layup components, or to a grounding system, to minimize excessive current density in a localized region from lightning direct effects and other electrical benefits.

Further areas of applicability and advantages of the disclosed CFRP composite layups and related methods will become apparent when the detailed description is considered in conjunction with the following drawings. It should be understood that the detailed description and specific examples are intended for purposes of illustration only and are not intended to limit the scope of the disclosure.

BRIEF DESCRIPTION OF THE DRAWINGS

Various embodiments will be hereinafter described with reference to drawings for the purpose of illustrating the foregoing and other aspects of the disclosure.

FIG. 5A is an illustration of a side view of the CFRP composite layup of FIG. 5 showing a first alternative arrangement of inter-ply electrical connections in the CFRP composite layup.

FIG. 5B is an illustration of a side view of the CFRP composite layup of FIG. 5 showing a second alternative arrangement of inter-ply electrical connections in the CFRP composite layup.

FIG. 6A is an illustration showing a cross section view taken along the line 6A-6A in FIG. 6 including a first alternative form of the crimp in the CFRP composite layup.

FIG. 6B is an illustration showing another cross section view of the CFRP composite layup in accordance with the third embodiment showing a second alternative form of the crimp in the CFRP composite layup.

DETAILED DESCRIPTION

In the following detailed description, various embodiments of an apparatus and methods for mitigating edge glow and providing other electrical benefits in aircraft components and structures made from carbon fiber reinforced plastic ("CFRP") layups are described to illustrate the general principles of the present disclosure. The disclosed CFRP composite layups are suitable for use in a wide variety of aircraft and aerospace applications where an airborne vehicle may experience a lightning strike, or where it is desired to manage electrical current transfers between composite layers or plies of a CFRP composite layup.

This disclosure is merely exemplary in nature and is in no way intended to limit the scope of the disclosed apparatus and method, its applications or its uses. It will be immediately recognized by one skilled in the art that the present disclosure may be practiced in other analogous applications or environments and/or with other analogous or equivalent variations of the illustrative embodiments. For example, the disclosed CFRP composite layups are just as readily adapted for use with ground-based vehicles or ground-based structures wherein the abilities to mitigate edge glow or other lightning direct effects, or to manage the flow of electrical current (e.g., from lightning strikes or electrical connections for electrical/electronic systems and electrical grounds) are desired. It should also be noted that those methods, procedures, components, or functions which are commonly known to persons of ordinary skill in the field of the disclosure are not described in detail herein.

In all embodiments of this disclosure, inter-ply electrical connections in a CFRP composite layup form a bridge between the composite layers or plies of the CFRP composite layup to electrically connect the carbon fiber reinforcement material in each of the composite layers or plies of the CFRP composite layup. This bridge promotes electrical current flow between the composite layers and decreases the inter-ply voltage potential between the composite layers, thereby mitigating edge glow. It has been found that edge glow is significantly reduced if the inter-ply voltage can be reduced (for example, to below a particular threshold level for the material system and design configuration) and the z-conductivity increased (for example, to at least the conductivity level of carbon fiber). This bridge also provides the ability to manage electrical transfers between the composite layers or plies, to effectively control the flow of electricity (e.g., from lightning strikes or electrical signals) through the CFRP composite layup. For example, lightning current may be routed from a higher threat zone to a lower threat zone of an aircraft or other structure, or to a grounding system within the aircraft or other structure.

Figure 1:
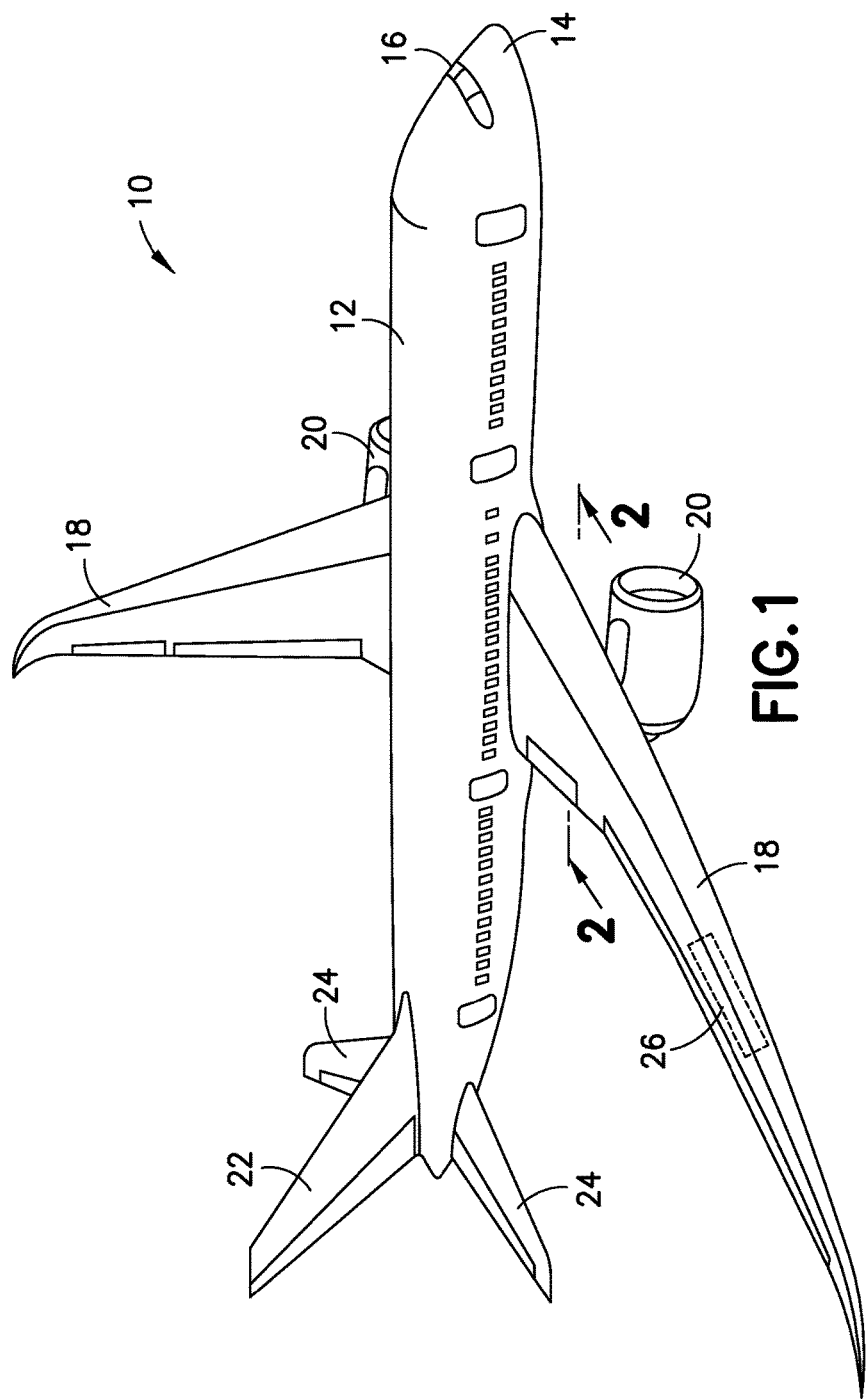
FIG. 1 is an illustration of a perspective view of an exemplary aircraft.

Referring more particularly to the drawings, FIG. 1 is an illustration of a perspective view of an exemplary aircraft 10 that may incorporate a composite structure 26 constructed from CFRP composite layup components in accordance with this disclosure. As shown in FIG. 1, the aircraft 10 comprises a fuselage 12, a nose 14, a cockpit 16, wings 18, one or more propulsion units 20, a vertical tail portion 22, and horizontal tail portions 24. The composite structure 26 may be any of the foregoing aircraft structures or any other type of structure (such as a wing box and fuel tanks) that is manufactured, fabricated or assembled, in whole or in part, from one or more component parts (such as frames, stringers, panels, spars and ribs) made from CFRP composite layups in accordance with this disclosure. Although the aircraft 10 shown in FIG. 1 is generally representative of a commercial passenger aircraft having one or more composite structures 26, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable vehicles or items having composite structures.

Figure 2:
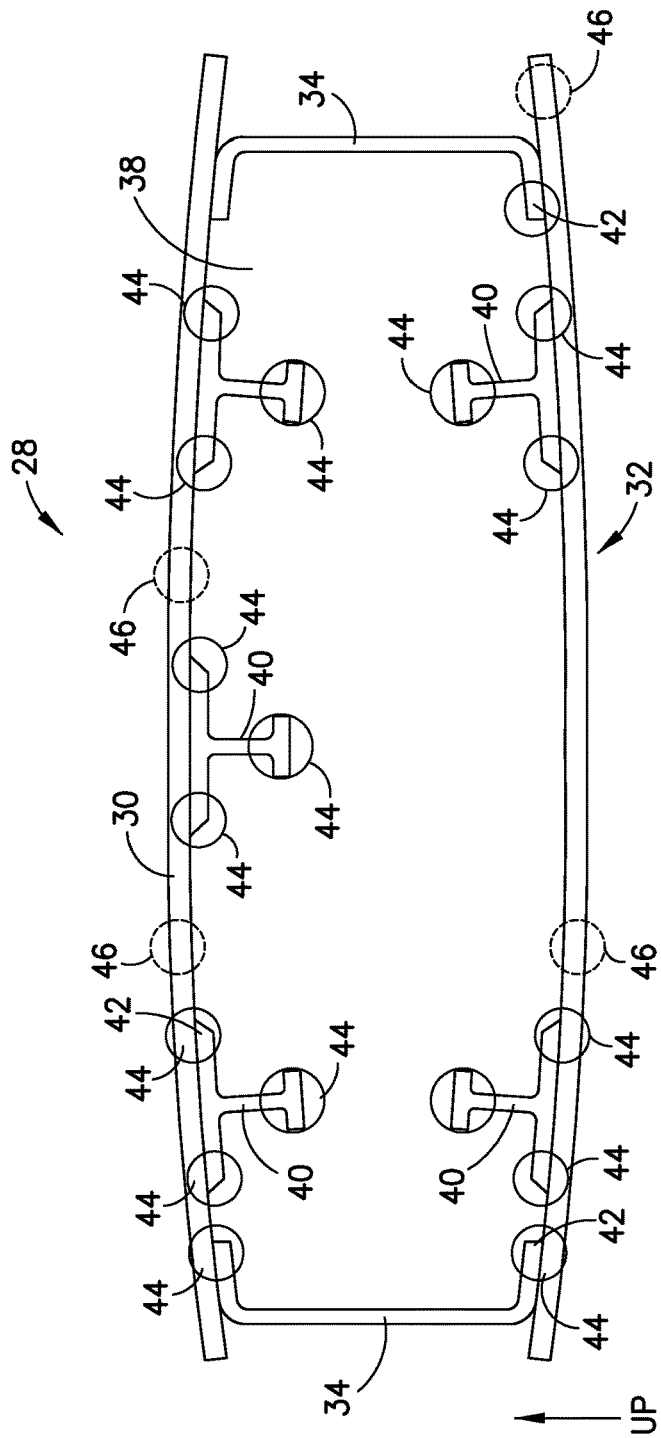
FIG. 2 is an illustration of a cross-section of an aircraft wing taken along the line 2-2 of FIG. 1 showing a wing box structure with exemplary locations for z-conductivity features.

FIG. 2 is a partial cross-sectional view of the wings 18 taken along the line 2-2 in FIG. 1. This section of the wings 18 is known as a wing box 28, which may be formed by CFRP composite layup components such as an upper panel 30 and a lower panel 32 connected together with spars 34 to form an interior portion 38 of the wing box 28, which can be used for example to hold a fuel tank (not shown). The upper panel 30 and lower panel 32 of the wing box 28 are provided with stringers 40 which support the wing box 28 structure. The stringers 40 may be I-shaped as shown in FIG. 2 or hat shaped, z-shaped or any other shape (not shown) suitable for a particular application. FIG. 2 illustrates exemplary locations 44 where z-conductivity features of this disclosure may be applied to eliminate edge sealing requirements, such as at cut edges 42 of the CFRP composite layups forming stringers 40, spars 34, upper panel 30 and lower panel 32, or at any location throughout the length 46 of the CFRP composite layup component such as upper panel 30 and lower panel 32, to provide enhanced z-conductivity and the advantages attendant thereto. CFRP composite layups with the z-conductivity features disclosed herein may also be employed in other locations throughout the aircraft 10.

CFRP composite layups of the type disclosed herein are constructed in accordance with typical composite layup processes that are modified to provide inter-ply connections and z-conductivity features in accordance with this disclosure. Typical composite part fabrication starts with a mold, tool or mandrel in a desired shape and size on which CFRP composite layers or plies will be laid up for making CFRP composite layups having the desired shape and size. The surface of the mold, tool or mandrel is then prepared for the layup process by cleaning the surface and applying a release agent to prevent resin from sticking to the surface. A layer of tackifier resin film or solution is then applied to hold down the first composite layer or ply. One or more CFRP composite layers or plies are then laid up in or on the mold, tool or mandrel in accordance with specified design parameters. The number of composite plies or layers and the orientation of carbon fiber reinforcement material in the mold, tool or mandrel are determined by the structural requirements of the CFRP composite layup, which should be optimized based on multiple design factors including loads, impact, weight, electromagnetic effects (EME) and other factors known in the art. The z-conductivity features, if implemented, would be part of the structural design and need to be accounted for in the layout. For example, for aerospace grade components and structures, the thickness of each composite ply or layer could be in the range of about 5 to 10 mils, or about 127 to 250 microns.

Curing may be done in many different ways known in the art. For example, curing may be done with a vacuum bag and air circulating oven; or in an autoclave, with pressure, temperature and cure times dependent on many factors known in the art, such as part design, material chemistry, and mass of the part including the mold, tool or mandrel.

In accordance with this disclosure, four exemplary CFRP composite layups 50, 80, 100, 120 are constructed with a plurality of CFRP composite plies or layers 52, as depicted in FIGS. 3-8. Each of the composite plies or layers 52 comprises a conductive carbon fiber reinforcement material 54 and a resin matrix material 56. During the layup process, at least a portion of the conductive carbon fiber reinforcement material 54 in each of the composite plies or layers 52 is electrically connected to at least a portion of the conductive carbon fiber reinforcement material 54 in an adjacent one of the composite plies or layers 52 of the CFRP composite layups 50, 80, 100, 120 to provide inter-ply electrical connections 58 and z-conductivity through the CFRP composite layups 50, 80, 100, 120. In some embodiments, the inter-ply connections 58 are made through an entire thickness 60 of CFRP composite layups 50, 80, 100, 120 such that the carbon fiber reinforcement material in a bottom ply 62 at a lower surface 63 of the CFRP composite layups 50, 80, 100, 120 is electrically connected to the carbon fiber reinforcement material in a top ply 64 at an upper surface 65 of the CFRP composite layups 50, 80, 100, 120. The inter-ply connections 58 are usually formed at or near a cut edge 66 of the CFRP composite layups 50, 80, 100, 120 where ends 55 of the conductive carbon fiber reinforcement material 54 are exposed to the environment but may also be at other locations.

Figure 3:
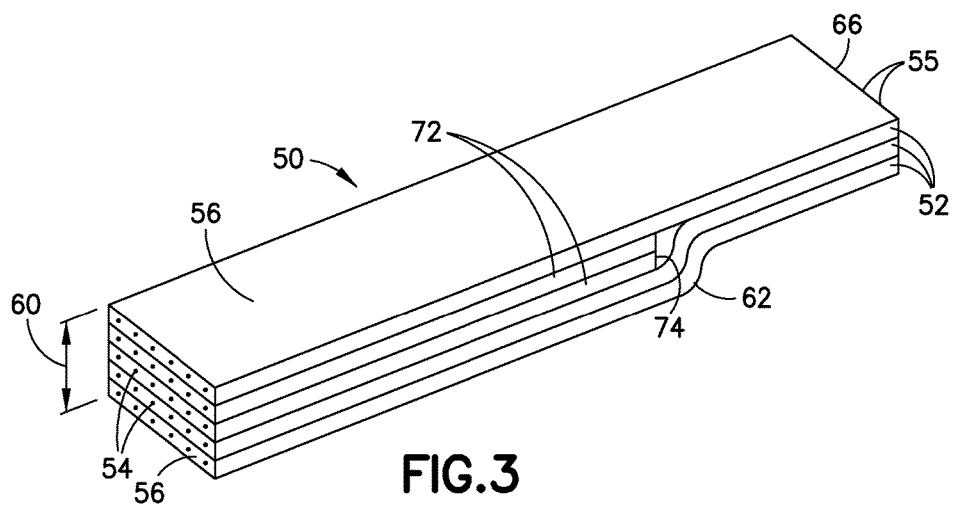
FIG. 3 is an illustration of a perspective view of a first embodiment of a CFRP composite layup comprising inter-ply electrical connections formed by an out-of-plane distortion in the carbon fiber plies.
Figure 3A:
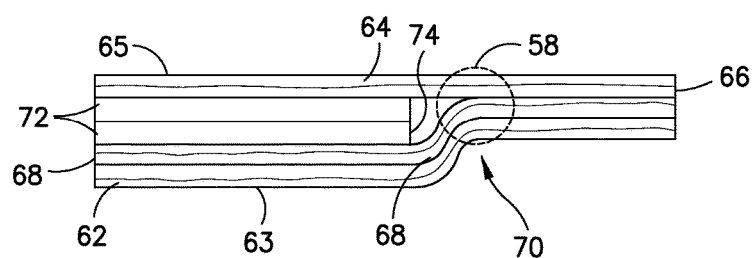
FIG. 3A is an illustration of a side view of the first embodiment of a CFRP composite layup shown in FIG. 3.

FIGS. 3 and 3A are illustrations of a first embodiment of a multiple ply CFRP composite layup 50 having a bottom ply 62, a top ply 64 and one or more inner plies 68, wherein one or more of the inner plies 68 is configured with one or more out-of-plane distortions (i.e., a wave or fold) 70 at or near the cut edge 66 of the CFRP composite layup 50 where the inter-ply connections 58 are formed. For example, for edge glow mitigation applications, the out-of-plane distortions 70 may be formed about 1 inch or less from the cut edge 66. Alternatively, for other applications, the one or more out-of-plane distortions 70 may be strategically inserted into the CFRP composite layup 50 at any location where z-conductivity is desired. The out-of-plane distortions 70 are a joggle, a wave or fold in two or more of the composite plies or layers 52 where the composite plies or layers 52 are closer together and short the conductive carbon fiber reinforcement material 54 in each of the composite plies or layers 52 that form the out-of-plane distortions 70. The short may be the result of resin reduction due to bridging or localized stress points created by the inserted cured plies so the carbon fiber reinforcement materials 54 in each of the composite plies or layers 52 touch. Such out-of-plane distortions 70 are similar to a bow wave, which is characterized as a natural local distortion or ripple in one or more plies of a composite structure that sometimes occur unintentionally during the manufacturing or curing of composite structures. Strategically placed out-of-plane distortions 70 can serve to eliminate edge glow and sparking resulting from a lightning strike by electrically shorting the composite plies. In addition to preventing edge glow, electrical shorts formed at the out-of-plane distortions 70 between composite plies or layers 52 of the CFRP composite layup 50 may also be applied toward any designs as electrical vias to support managed transfer of electrical energy between composite plies or layers 52 of the CFRP composite layup 50.

The out-of-plane distortions 70 are induced during the curing steps of the lay up process, and formed by inserting one or more layered forming tools 72 between the uncured composite plies or layers 52. The one or more layered forming tools 72 each comprise a cured carbon fiber laminate of specific dimensions smaller than the dimensions of the CFRP composite layup 50 that is being formed by the lay up process. The amplitude of the out-of-plane distortions 70 is proportional to the height of the forming tools 72. The one or more layered forming tools 72 are inserted between the composite plies or layers 52 during the lay up of the composite plies or layers 52 and prior to cure. The out-of-plane distortions 70 forms at an edge 74 of the one or more layered forming tools 72 where the uncured composite plies or layers 52 extend past the edges of the one or more layered forming tools 72. The forming tools 72 are embedded in the CFRP composite layup 50 and promote localized stress points and fiber displacement during curing. This alternating arrangement of out-of-plane distortions 70 may be formed at or near the cut edge 66 of the CFRP composite layup 50 or anywhere else along the length of the CFRP composite layup 50A.

Figure 4:
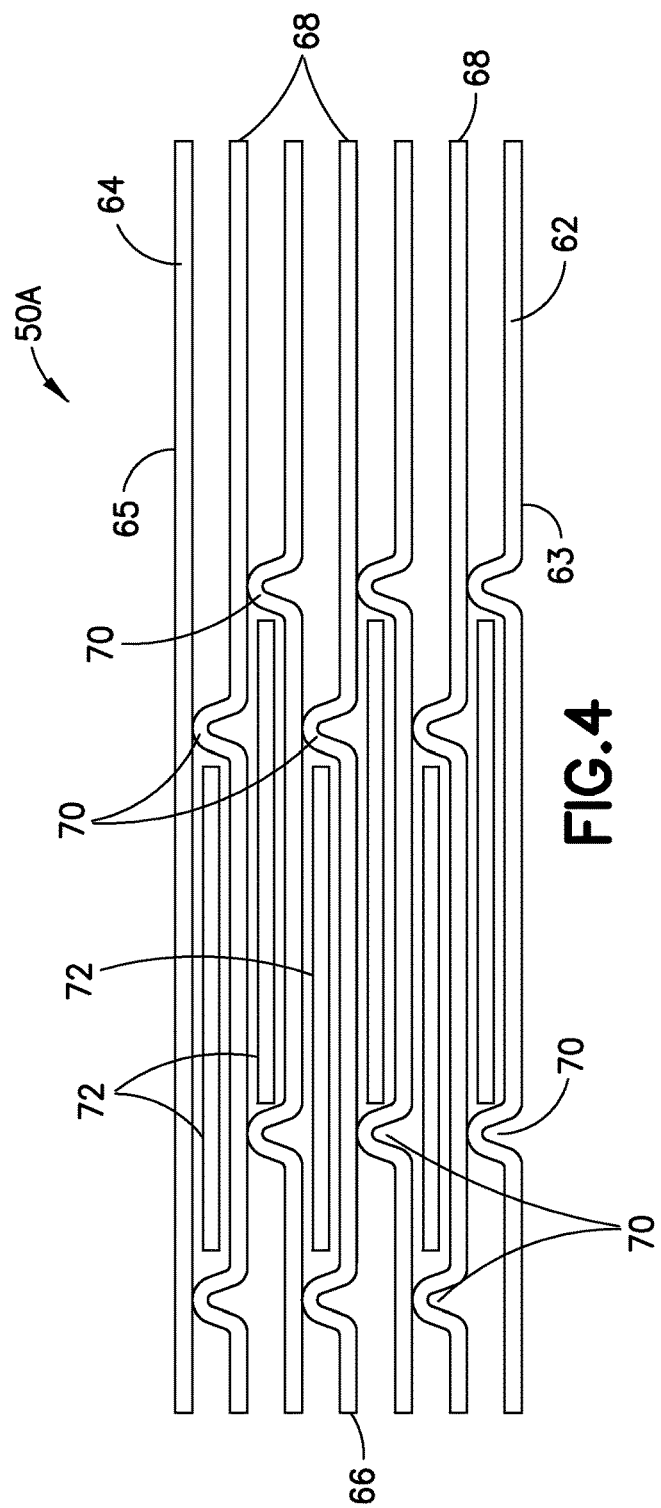
FIG. 4 is an illustration of a side view of a CFRP composite layup in accordance with a further arrangement of multiple carbon fiber out-of-plane distortions to achieve inter-ply electrical connections.
Figure 5:
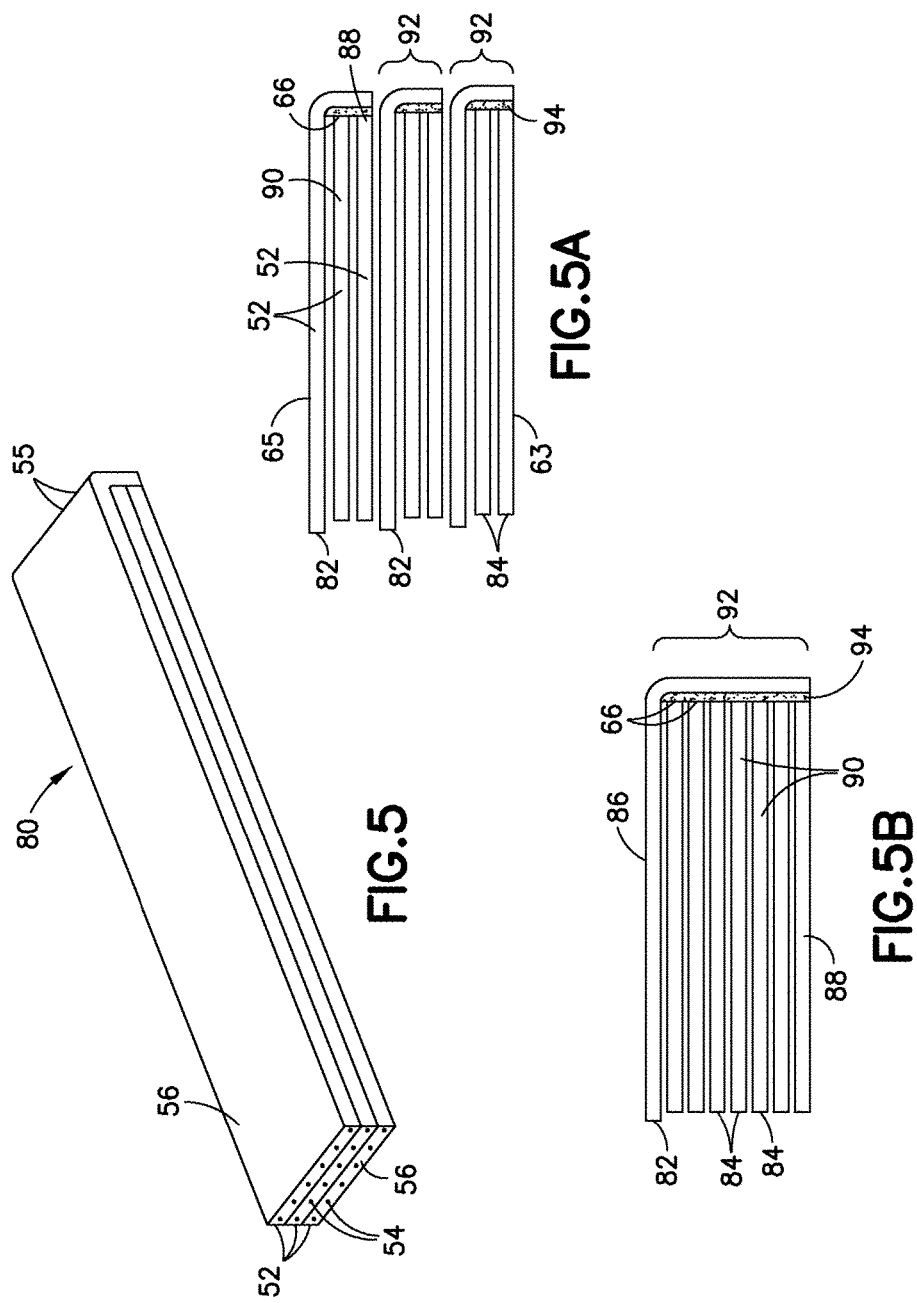
FIG. 5 is an illustration of a perspective view of a second embodiment of a CFRP composite layup comprising inter-ply electrical connections formed by wrapping a longer ply over one or more shorter adjacent plies.

FIG. 4 shows an alternative arrangement of out-of-plane distortions 70 in a CFRP composite layup 50A where all of the composite plies or layers 52 are bridged together by a plurality of out-of-plane distortions 70. The composite plies or layers 52 comprise a bottom ply 62, a top ply 64, and a plurality of inner plies 68 of CFRP composite material. Forming tools 72 are placed between each of the composite plies or layers 52 at staggered alternating locations in a lengthwise direction such that the out-of-plane distortions 70 form on both sides of the forming tools 72. This alternating arrangement of out-of-plane distortions 70 may be formed at or near the cut edge 66 of the CFRP composite layup 50 or anywhere else along the length of the CFRP composite layup 50A.

A second embodiment of a multiple ply CFRP composite layup 80 is shown in FIGS. 5A and 5B. In accordance with this second embodiment, the composite layers or plies 52 are laid up in an alternating arrangement of long plies 82 and short plies 84. The long plies 82 are wrapped over a cut edge 66 of each of the short plies 84 such that the carbon fiber reinforcement material 54 in the long plies 82 makes electrical contact with the carbon fiber reinforcement material 54 at the cut edge 66 of the short plies 84, to form inter-ply electrical connections 58.

The alternating arrangement of long plies 82 and short plies 84 may include any number of variations, provided that one of the long plies 82 wraps over the cut edges 66 of the short plies 84. For example, the composite layers or plies 52 may be arranged such that an upper ply 86 has a length that is longer that the length of a lower ply 88 and one or more inner plies 90, such that a portion of the upper ply 86 that extends past the lower ply 88 and the one or more inner plies 90 a sufficient length to wrap over and make electrical connections with the cut edges 66 of the short plies 84. The alternating arrangement of long plies 82 and short plies 84 may include a plurality of long plies 82 each of the long plies forming an upper ply 86 that is wrapped over the cut edges of a lower ply 88 and one or more inner plies 90 to form a stack 92, which can then be laid up onto one or more additional stacks 92 as shown in FIG. 5A. Alternatively, the arrangement of long plies 82 and short plies 84 may include a single long ply 82 forming an upper ply 86 that is wrapped over the cut edges 66 of short plies 84 arranged as a lower ply 88 and a plurality of inner plies 90 to form a single stack 92 as shown in FIG. 5B.

During the lay-up process for manufacturing a CFRP composite layup 80 in accordance with the second embodiment, resin matrix material 56 is removed from the surface of a cut edge 66 of the composite layers or plies 52 that form the short plies 84 in the stack 92. The resin matrix material 56 may be removed, for example, by abrasion taking care to avoid damaging the carbon fiber reinforcement material 54. Plasma etching may be used to remove surface resin using commercially available plasma etching equipment for 5-10 minutes at 75W with 1 torr oxygen. These parameters will vary depending on the plasma etching equipment used. A sufficient amount of resin matrix material 56 should be removed so that tips of carbon fiber reinforcement material 54 in the short plies 84 are exposed so they can make contact with carbon fiber reinforcement material 54 in the long plies 82. After the resin matrix material 56 is removed from the cut edge 66 to expose the tips of the carbon fiber reinforcement material 54, any loose particles and dust should be removed by blowing the composite layers or plies 52 with clean, oil-free air.

In order to construct the CFRP composite layup 80 of this second embodiment, the cut edges 66 of the composite plies or layers 52 formed as short plies 84 are covered with a thin layer of conductive sealant/adhesive 94 having a minimum electrical conductivity of $10^4$ S/m. The volume of applied sealant/adhesive 94 should be sufficient to provide a cured bond line thickness of about 0.0005 to 0.001 inch. This adhesive system is typically a fuel resistant, aerospace grade epoxy, such as Bisphenol-A diglycidyl ether, or triglycidyl-p-aminophenol, N,N,N,N-tetraglycidyl-4,4-methylenebis benzylamine based systems, that is sufficiently combined with a conductive doping material system to achieve the desired electrical conductivity level. The conductive doping material system may include indium tin oxides, carbon nanotubes, metallic (such as silver, nickel or copper) nanowires, nano or micro size particles. The conductive sealant/adhesive 94 wets the ends of the carbon fiber reinforcement material 54 and joins carbon fiber reinforcement material 54 in adjacent composite layers or plies 52 together electrically, and may be, for example, a conductive epoxy or doped polysulfide. The composite layer or ply 52 that is formed as a long ply 82 is then laid up on top of the short plies 84 and wrapped over the cut edges 66 of the short plies 84 to cover all of the exposed carbon fiber reinforcement material 54 in each of the short plies 84. A peel ply may then be placed over the assembly of laid up composite layers or plies 52, and the assembly is cured, such that the conductive sealant/adhesive 94 is cured between the upper ply 86 and the cut edges 66 of the short plies 84 concurrently with the curing of the layup assembly to form the CFRP composite layup 80 of the second embodiment. Curing may be done by vacuum bagging at a temperature and pressure profile appropriate for the material system and design of the CFRP composite layup 80 in accordance with known practices.

Figure 6:
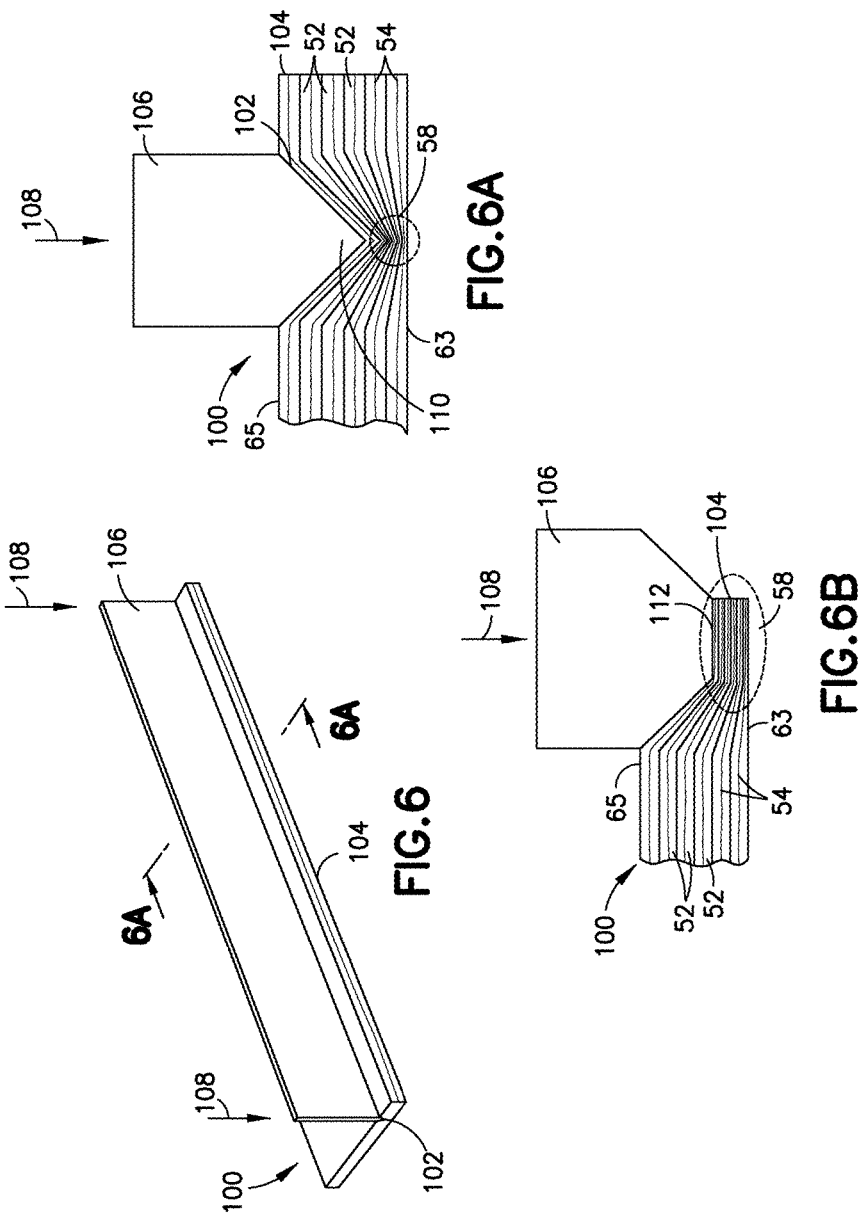
FIG. 6 is an illustration of a perspective view of a third embodiment of a CFRP composite layup comprising inter-ply electrical connections formed by crimping carbon fibers prior to resin cure.

FIGS. 6, 6A and 6B show a third embodiment of a CFRP composite layup 100 comprising a crimp 102 formed at or near a cut edge 104 of the CFRP composite layup 100 to push conductive carbon fiber reinforcement material 54 in each of the composite plies or layers 52 together and form inter-ply electrical connections 58. The crimp 102 is a depressed area arranged to extend an entire length of the cut edge 104 and substantially parallel to the cut edge 104. The crimp 104 is formed during the cure step of the lay up process using a blade or tool 106 made from a substantially rigid material that can withstand the cure process. The blade or tool 106 is positioned in the desired crimp area, and enhanced pressure exceeding the nominal pressure level applied to other surfaces of the part, for example, is applied to the blade 106 in the direction of arrows 108 to push the composite layers or plies 52 in the crimp area together and cause inter-ply electrical connections 58 to form between the carbon fiber reinforcement material 54 in the crimp area. Inter-ply electrical connections 58 are formed when the conductive carbon fiber reinforcement material 54 in each of the composite plies or layers 52 are pushed together to within a distance of approximately 10 micron or less.

The crimp area can be positioned at any location across a width of the composite plies or layers 52, or multiple crimps may be formed across the width of the composite plies or layers 52. FIG. 6A shows a first configuration of the blade 106 having a pointed crimping edge 110 positioned near the cut edge 104 of the composite plies or layers 52. FIG. 6B shows another configuration of the blade 106 having a flattened crimping edge 112 positioned at the cut edge 104. The blade 106 may be configured with crimping edges having other shapes and sizes, such as rounded or other shapes, provided sufficient force is applied to form a crimp 102 where conductive carbon fiber reinforcement material 54 in each composite ply or layer 52 is forced together to form inter-ply electrical connections 58. For example, the crimp area may have a width on the order of about 1 inch or less and, for edge glow mitigation applications, be positioned about 1 inch or less from the cut edge 104.

Figure 7:
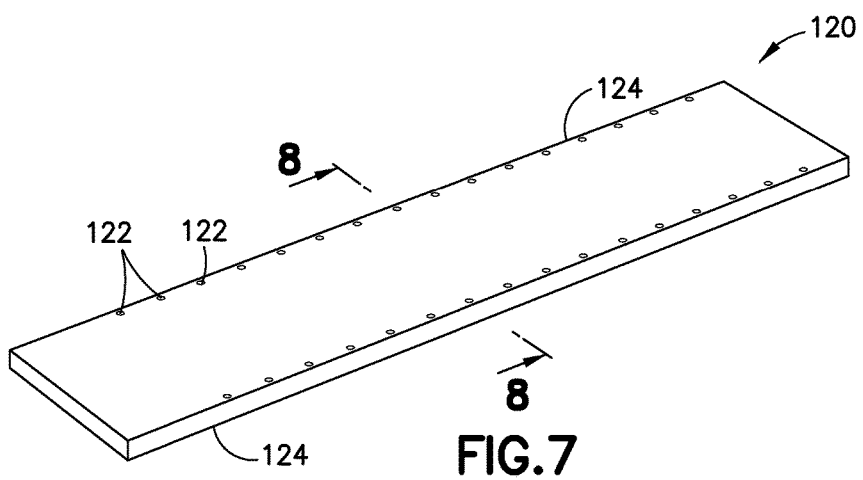
FIG. 7 is an illustration of a perspective view of a fourth embodiment of a CFRP composite layup comprising inter-ply electrical connections formed with a conductive material penetrating through the CFRP composite layup.
Figure 8:
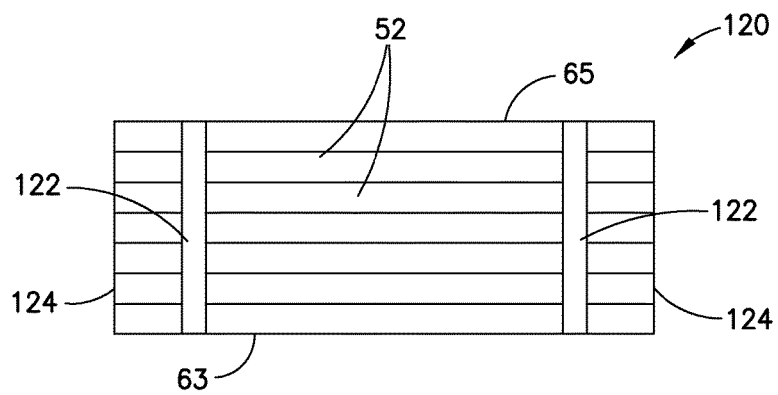
FIG. 8 is an illustration of a cross-sectional view of the CFRP composite layup shown in FIG. 7 taken along the line 8-8.

A fourth embodiment of a CFRP composite layup 120 is shown in FIGS. 7 and 8 wherein two or more composite layers or plies 52 are laminated together with a conductive material 122 that penetrates through some or all of the composite layers or plies 52 at or near a cut edge 124 of the CFRP composite layup 120 to electrically short the composite layers or plies 52 in the z-direction. The conductive material 122 has at least the conductivity of carbon (i.e., $10^4$ S/m). Examples of suitable conductive materials 122 include dry carbon fiber threads, titanium threads, metallic threads, or metallic z-pins, staples or nails, which are readily available in the marketplace. Suitable commercially available threads include THERMOSEW 100% stainless steel multi-filaments sewing yarns, ANTISTATIB stainless steel micro filaments tow for printers antistatic brushes and other devices, and CARBON sewing threads, all available from TIBTECH Innovations, France, and TENAX® carbon fibers available from Toho Tenax Group, Germany.

The conductive material 122 may be arranged in one or more rows positioned about 1 inch or less from the cut edge 124 before curing the CFRP composite layup 120. The conductive material 122 could be positioned in areas that will not affect the mechanical strength of the CFRP composite layup 120. If conductive material 122 is arranged in more than one row, the conductive material 122 can be staggered or positioned to zig-zag along the cut edge 124. The conductive material 122 may be spaced apart by about 1 inch or less. For edge glow mitigation applications, the conductive material 122 should extend through an entire thickness of the CFRP composite layup 120 (as shown in FIG. 8) to provide inter-ply electrical connections 58 at or near the cut edge 124 through the entire thickness of the CFRP composite layup 120. For other electrical routing applications, the conductive material 122 can be positioned in other locations and in selected composite layers or plies 52.

Figure 9:
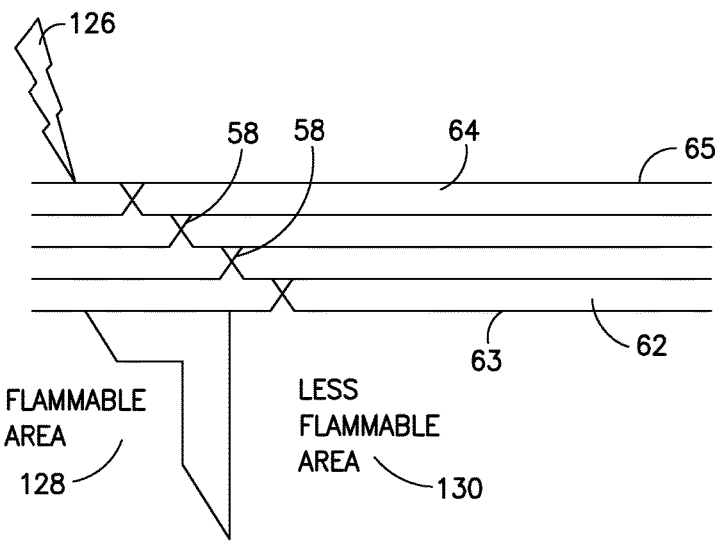
FIG. 9 is an illustration of a side view of a CFRP composite layup with inter-ply electrical connections to transfer electrical current from one location to another location within a structural component.
Figure 10:
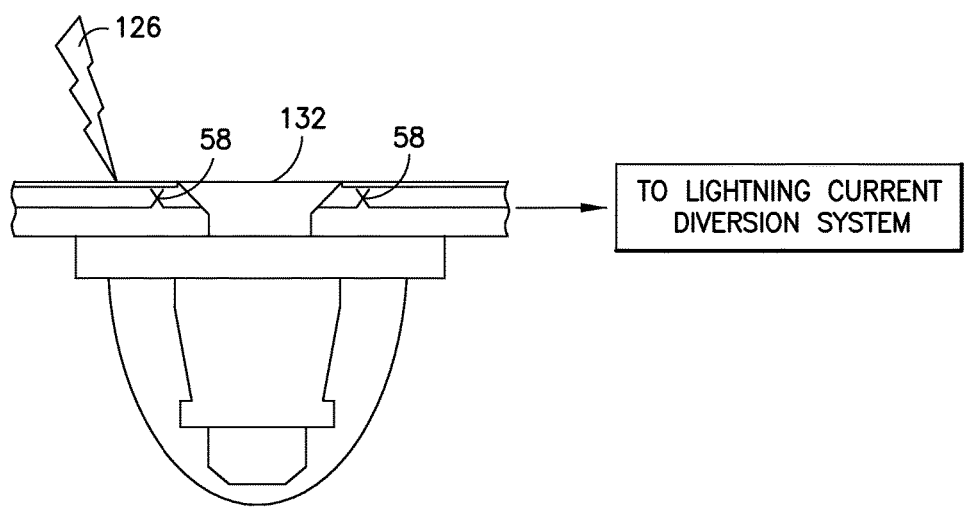
FIG. 10 is an illustration of a side view of a CFRP composite layup proximate a skin fastener in which inter-ply electrical connections may be used to transfer electrical current from a surface layer to an adjacent layer at strategic locations.

If left unchecked, a lightning strike will send electrical current through a composite layup via the path of least resistance. If the composite layup is configured as a component of a fuel tank or other susceptible environment, edge glow, sparking or other lightning direct effects could have a negative impact. The disclosed CFRP composite layups 50, 80, 100, 120 provide inherent features to mitigate edge glow, sparking and other lightning direct effects by controlling the flow of electrical current through strategically arranged inter-ply connections 58. Examples of applications for the CFRP composite layups 50, 120 of the first and fourth embodiments disclosed herein are shown in FIGS. 9 and 10. As shown in FIG. 9, the inter-ply electrical connections 58 can be positioned to transfer electrical current resulting from a lightning strike 126 that hits a top ply 64 of the CFRP composite layup 50, 120 proximate a flammable area 128 to a bottom ply 62 of the CFRP composite layup 50, 120 in a less flammable area 130. In FIG. 10, electrical current resulting from lightning strike 126 proximate a skin fastener 132 is transferred to a co-cured metal lightning current diversion system (not shown).

Each of the CFRP composite layups 50, 80, 100, 120 disclosed herein may be used in methods for preventing edge glow in the CFRP composite layups and in the components and structures formed there from, including in fuel tanks and other susceptible environments. They can also be used to create other electrical channels as part of an electrical systems design.

While the invention has been described with reference to certain exemplary embodiments, such embodiments are for purposes of illustration and not limitation. It will be understood by those skilled in the art that various changes may be made and equivalents may be substituted for elements thereof without departing from the scope of the invention. In addition, many modifications may be made to adapt a particular situation to the teachings herein without departing from the essential scope thereof. Therefore it is intended that the claims not be limited to the particular embodiments disclosed. The method claims set forth hereinafter should not be construed to require that the steps recited therein be performed in alphabetical order or in the order in which they are recited, and should not be construed to exclude two or more steps being performed contemporaneously during at least a portion of the duration of one of said steps.

The invention claimed is:

1. A CFRP composite layup comprising:
    a plurality of composite plies, each having a conductive carbon fiber reinforcement material surrounded by a non-conductive matrix material and a cut edge where ends of the conductive carbon fiber reinforcement material are exposed,
    two or more of the composite plies having an out-of-plane distortion where the conductive carbon fiber reinforcement material in each of the two or more composite plies is closer together to form inter-ply electrical connections about 1 inch or less from the cut edge where a thickness of the non-conductive matrix material is reduced and at least a portion of the conductive carbon fiber reinforcement material in each of the composite plies is electrically connected to at least a portion of the conductive carbon fiber reinforcement material in an adjacent ply of the CFRP composite layup such that the carbon fiber reinforcement material in a lower ply at a lower surface of the CFRP composite layup is electrically connected to the carbon fiber reinforcement material in an upper ply at an upper surface of the CFRP composite layup through the carbon fiber reinforcement material in one or more inner plies between the upper ply and the lower ply.

2. The CFRP composite layup of claim 1, further comprising one or more layered forming tools consisting of cured carbon fiber composite layups of specific dimensions smaller than dimensions of the CFRP composite layup embedded between at least two of the composite plies, the out-of-plane distortion formed at an edge of the forming tools.

3. The CFRP composite layup of claim 2, wherein a first of the one or more layered forming tools is embedded between the upper ply of the CFRP composite layup and a first ply of the inner plies at a first position along a length of the CFRP composite layup to form a first out-of-plane distortion, and a second of the one or more layered forming tools is embedded between a second ply and a third ply of the inner plies at a second position along the length of the CFRP composite layup to form a second out-of-plane distortion staggered in a lengthwise direction from the first out-of-plane distortion.

4. The CFRP composite layup of claim 1, further comprising an electrically conductive material penetrating through an entire thickness of the CFRP composite layup in one or more rows positioned about 1 inch or less from the cut edge to electrically short the carbon fiber reinforcement material in each of the composite plies to form the inter-ply electrical connections.

5. The CFRP composite layup of claim 4, wherein the electrically conductive material has a conductivity of at least $10^4$ Siemens/meter.

6. The CFRP composite layup of claim 4, wherein the one or more rows of the electrically conductive material are staggered at different distances from the cut edge.

7. A CFRP composite layup comprising:
    a plurality of composite plies, each having a conductive carbon fiber reinforcement material surrounded by a non-conductive matrix material and a cut edge where ends of the conductive carbon fiber reinforcement material are exposed; and
    a crimp through the plurality of composite plies that pushes the conductive carbon fiber reinforcement material in each of the composite plies together to form inter-ply electrical connections about 1 inch or less from the cut edge where a thickness of the non-conductive matrix material is reduced and at least a portion of the conductive carbon fiber reinforcement material in each of the composite plies is electrically connected to at least a portion of the conductive carbon fiber reinforcement material in an adjacent ply of the CFRP composite layup such that the carbon fiber reinforcement material in a lower ply at a lower surface of the CFRP composite layup is electrically connected to the carbon fiber reinforcement material in an upper ply at an upper surface of the CFRP composite layup through the carbon fiber reinforcement material in one or more inner plies between the upper ply and the lower ply.

8. The CFRP composite layup of claim 7, wherein the crimp extends substantially parallel to the cut edge and across a width of the composite plies.

9. The CFRP composite layup of claim 7, wherein the conductive carbon fiber reinforcement material in each of the composite plies are pushed together to within a distance of 10 micron or less.

10. The CFRP composite layup of claim 7, wherein the crimp is a depressed area having a width of about 1 inch or less.

11. A CFRP composite layup comprising:
a plurality of composite plies, each having a conductive carbon fiber reinforcement material surrounded by a non-conductive matrix material and a cut edge where ends of the conductive carbon fiber reinforcement material are exposed, and
two or more of the composite plies having two or more out-of-plane distortions where the conductive carbon fiber reinforcement material in each of the two or more composite plies is closer together to form inter-ply electrical connections positioned at a plurality of locations throughout a length of the CFRP composite layup where a thickness of the non-conductive matrix material is reduced and at least a portion of the conductive carbon fiber reinforcement material in each of the composite plies is electrically connected to at least a portion of the conductive carbon fiber reinforcement material in an adjacent ply of the CFRP composite layup such that the carbon fiber reinforcement material in a lower ply at a lower surface of the CFRP composite layup is electrically connected to the carbon fiber reinforcement material in an upper ply at an upper surface of the CFRP composite layup through the carbon fiber reinforcement material in one or more inner plies between the upper ply and the lower ply.

12. The CFRP composite layup of claim 11, further comprising one or more layered forming tools of specific dimensions smaller than dimensions of the CFRP composite layup embedded between at least two of the composite plies, the out-of-plane distortion formed at an edge of the forming tools.

13. The CFRP composite layup of claim 12, wherein a first of the one or more layered forming tools is embedded between the upper ply of the CFRP composite layup and a first ply of the inner plies at a first position along a length of the CFRP composite layup to form a first out-of-plane distortion, and a second of the one or more layered forming tools is embedded between a second ply and a third ply of the inner plies at a second position along the length of the CFRP composite layup to form a second out-of-plane distortion staggered in a lengthwise direction from the first out-of-plane distortion.

14. The CFRP composite layup of claim 11, further comprising a crimp through the plurality of composite plies that pushes and electrically shorts the conductive carbon fiber reinforcement material in each of the composite plies together to form the inter-ply electrical connections.

15. The CFRP composite layup of claim 14, wherein the conductive carbon fiber reinforcement material in each of the composite plies are pushed together to within a distance of 10 micron or less.

16. The CFRP composite layup of claim 11, further comprising an electrically conductive material penetrating through an entire thickness of the CFRP composite layup in one or more rows to electrically short the carbon fiber reinforcement material in each of the composite plies to form the inter-ply electrical connections.

17. The CFRP composite layup of claim 16, wherein the electrically conductive material has a conductivity of at least $10^4$ Siemens/meter.

18. The CFRP composite layup of claim 16, wherein the one or more rows of the electrically conductive material are staggered at different distances from the cut edge.

* * * * *